Feb. 22, 1938. W. A. FLUMERFELT 2,108,814
JOINT CONSTRUCTION
Filed June 22, 1936 2 Sheets-Sheet 1
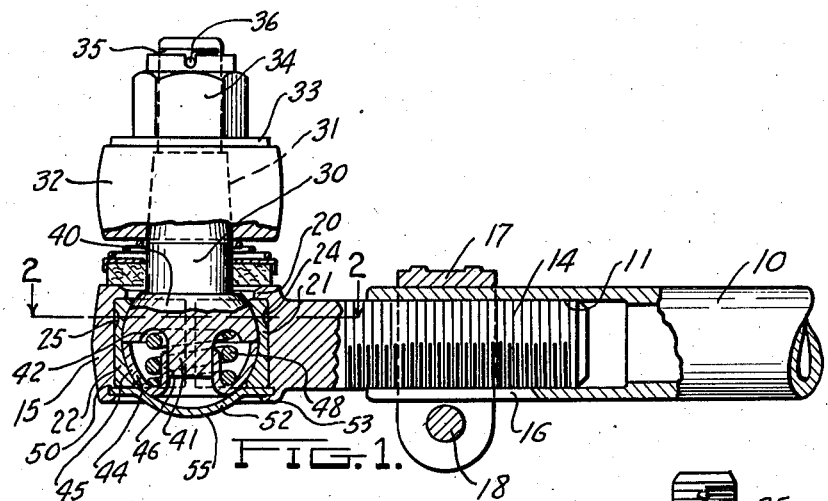
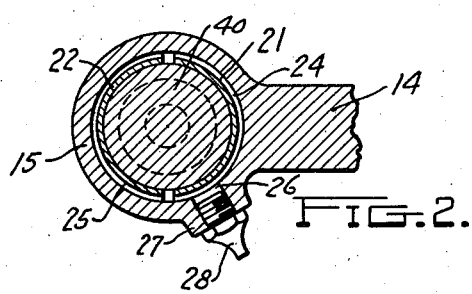
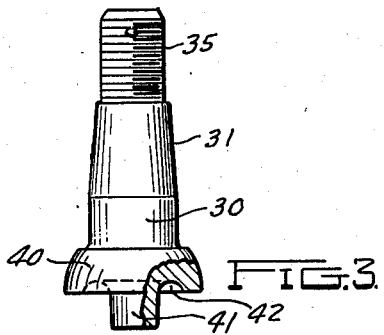
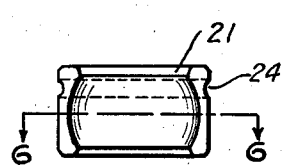
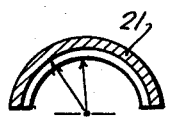
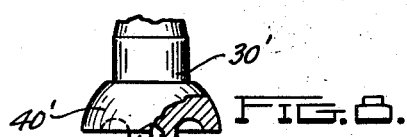
INVENTOR
William A. Flumerfelt
BY
Braselton, Whitcomb Davies
ATTORNEY Feb. 22, 1938. W. A. FLUMERFELT 2,108,814
JOINT CONSTRUCTION
Filed June 22, 1936
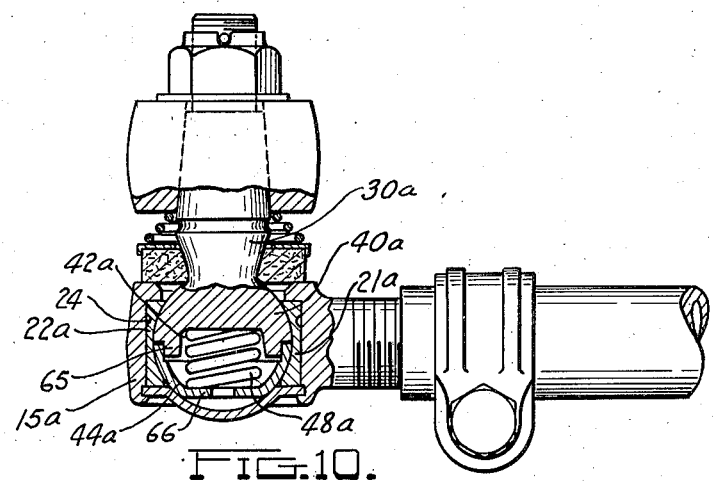
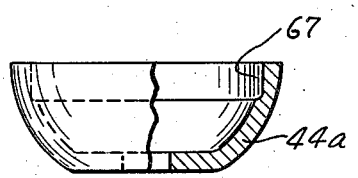
INVENTOR
William A. Flumerfelt
BY
Braselton, Whitcomb Davies
ATTORNEY Patented Feb. 22, 1938

2,108,814

UNITED STATES PATENT OFFICE.

2,108,814

JOINT CONSTRUCTION

William A. Flumerfelt, Columbus, Ohio, assignor to The Columbus Auto Parts Company, Columbus, Ohio, a corporation of Ohio Application June 22, 1936, Serial No. 86,525

6 Claims. (Cl. 287—90)

This invention relates to joints and more particularly of the character known as ball joints especially adapted for use in tie rod and drag link installations of automotive vehicles.

The invention contemplates the provision of a joint construction in which one of the elements is of multi-sectional spherical configuration with a spring means enclosed in the spherical configuration whereby the over-all dimension of a joint of this character may be substantially reduced.

The invention embraces the provision of an articulated joint wherein a stud member forming one of the elements of the joint is provided with a bearing portion cooperating with a second member having a bearing portion which together form one of the elements of the joint, the elements being held into engagement with surrounding bearing members by means of an interiorly positioned spring.

A further object of the invention is the provision of a joint structure wherein the ball configuration is made in two segmental spherical portions surrounded by bearing members, there being interengaging means between the component elements of the ball configuration whereby said elements maintain the same relative relation in various positions of articulation of the joint.

Another object of the invention is the provision of a joint wherein a portion is of spherical configuration fabricated of component parts surrounded by bearing members and in which a resilient means for holding the spherical configuration and the bearing members in fixed relation is contained within the spherical configuration, such arrangement providing a large bearing area in engagement with the bearing members, thus enhancing the life of the joint structure.

Still another object of the invention is the provision of a ball stud assembly of component parts in combination with spring means for holding the component parts of the ball in engagement with the surrounding bearing members so that during oscillatory movements of the ball stud assembly the component parts of the stud assembly always maintain a fixed relationship and the force of the spring means remaining uniform in all positions of articulation of the joint.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a vertical sectional view showing a joint construction of my invention;

Figure 2 is a horizontal sectional view taken substantially on the line 2—2 of Figure 1;

Figure 3 is an elevational view of a stud member forming an element of the present invention;

Figure 4 is an elevational view partly in section illustrating an element of the invention;

Figure 5 is a side elevational view showing one of the seat members of the joint construction;

Figure 6 is a horizontal sectional view taken substantially on the line 6—6 of Figure 5;

Figure 7 is an elevational view of a closure plate for the joint housing;

Figure 8 is a view similar to Figure 3 showing a modified form of stud construction.

Figure 9 is a view similar to Figure 4 illustrating a modified form of the arrangement illustrated in said figure;

Figure 10 is a view similar to Figure 1 showing a modified form of construction;

Figure 11 is a detail view showing one of the elements of my invention.

While I have illustrated the joint arrangement of my invention as especially adapted for tie rod connections, it is to be understood that I contemplate the use of the invention in any link or joint construction wherever the same may be found to be applicable.

Referring to the drawings in detail, I have illustrated an arrangement of joint construction as particularly adapted for use in connecting the pivotally mounted or steering wheels of a vehicle together in which numeral 10 illustrates an end portion of a tie rod preferably of tubular formation, being interiorly threaded as at 11 receiving a threaded tenon 14 formed, in the embodiment illustrated, as an integral part of the joint housing 15. A wall portion of the tube 10 is preferably split longitudinally as at 16 and surrounding the tube is a clamping member or collar 17 adapted to be drawn into close engagement with the tube 10 by means of a bolt 18 and nut (not shown), this clamping means serving to hold the tube 10 and tenon 14 of the joint housing in fixed relation.

The housing 15 is provided with a bore which terminates at one end in an annular shoulder portion 20. Within the bore is fitted ball seats or bearing members 21 and 22 which are generally semi-annular in form, as shown in Figure 2, the ball seats being slightly separated as shown in Figures 1 and 2. These ball seats or bearing members are formed interiorly with concave spherically shaped surfaces adapted to engage a ball shaped configuration formed by a plurality of elements as hereinafter explained. The ball seats 21 and 22 are provided in their exterior peripheral portions with grooves 24 and 25, one of which grooves is in registration with an opening 26 in a boss portion 27 formed integrally with the housing 15, the opening 26 being preferably threaded and accommodating a lubricant fitting 28, through which lubricant may be introduced into the housing to lubricate the bearing seats and other elements of the joint structure.

The joint structure of my invention is inclusive of a stud or member 30 having a tapered shank portion 31 adapted to receive an arm 32 which is connected to a dirigible road wheel (not shown) of a vehicle, the arm 32 being held in place by means of a washer 33 and a nut 34 engageable with a threaded portion 35 of the stud, the latter being locked in position by means of a cotter key 36 or other suitable means. The lower portion of the stud 30 is formed with a segmental spherical or ball shaped portion 40 which is of a suitable curvature to fit into the concave surfaces of the ball seats 21 and 22. The stud 30 is provided with a depending cylindrical tenon 41 and an annular recess 42. Positioned immediately beneath the spherically shaped portion 40 of the stud is a member 44 also formed with a spherically shaped portion 45 of substantially the same radius of curvature as the ball or spherically shaped portion 40 of stud member 30. The member 44 is preferably formed of sheet metal or the like and has an interiorly formed upwardly projecting annular flange 46 which is adapted to slidably receive and accommodate the tenon 41 of the stud 30. When the stud 30 and member 44 are assembled in position as illustrated in Figure 1, it is to be noted that the spherically shaped portion 40 of the stud and the spherically shaped portion 45 of member 44 together provide the major portion of a ball configuration which fits snugly within the ball seats 21 and 22 providing a substantial curved bearing area between these elements. Interposed between the stud 30 and the member 44 is a resilient means in the form of a coil spring 48 surrounding the annular flange 46 of member 44, one end of the spring resting in the annular groove or recess 42 formed in the stud 30. The spring 48 serves to at all times exert a uniform pressure tending to hold the spherically shaped portions 40 and 45 in close bearing contact at all times with the interior bearing surfaces of the seat members 21 and 22. In this manner the spring is entirely enclosed within the ball configuration and automatically compensates for any wear of the parts.

One end of the bore in the housing is formed with a shoulder portion 50 which is adapted to position a closure member 52 which in assembly of the joint is placed in position and the annular edge portion 53 of the housing swaged or spun over as illustrated in Figure 1 to hold the closure 52 in position. As particularly illustrated in Figures 1 and 7, the closure member 52 is formed with a central segmental spherically shaped depression or concave portion 55 whose interior radius of curvature is preferably the same as the radius of curvature of the spherically shaped portions 40 and 45 of the stud 30 and member 44 respectively. This spherical depression 55 of the closure 52 provides a further curved bearing surface cooperating with the member 44 and in curved alignment with the interior curvature of ball seats 21 and 22 so that during oscillatory movements of the stud 30 and member 44, portions of the member 44 will at all times be in intimate contact with the spherical curvature of the closure 52. The closure 52 therefore, in effect, provides a continuation of the seat members 21 and 22 as additional bearing surface.

Figures 8 and 9 illustrate a modified form of stud and cooperating member forming the ball configuration. The stud construction 30' shown in Figure 8 has the spherical shaped portion 40' and the depending tenon 41'. The tenon 41' is centrally bored as at 60 and adapted to accommodate a tenon or cylindrical projection 61 positioned axially of member 44'. The exterior of the member 44' is spherically shaped throughout its entire exterior surface and when assembled with the stud 30' into a complete joint structure of the character illustrated in Figure 1, the exterior spherical surface of the member 44' will contact the curvature 55' of the disk 52 so that substantially complete bearing surface may be had throughout the entire spherical surface formed by the ball stud 30' and the member 44'. Thus, a substantially increased bearing area is provided in this form of the invention so that wear of the parts is reduced to a minimum, and yet the over-all dimensions of the joint structure are not increased.

In the form of the invention shown in Figures 10 and 11, the stud member 30a is formed with a spherically shaped portion 40a having a central depending annular flange 65. Positioned beneath the spherically shaped portion 40a of the stud is a spherically shaped hollow member 44a having an uniplanar bottom portion 66. The interior upper portion of the member 44a is provided with a cylindrical surface 67 which is adapted to slidably fit the exterior surface of the depending annular flange 65 of the stud member. In this manner the interengaging portions of members 30a and 44a serve to keep the parts in proper relationship during articulation of the joint. A spring member 48a is positioned within a central recess 42a formed in the stud member, the lower end of the spring contacting the flat portion 66 of member 44a, thus serving to hold the ball shaped configuration formed by the spherically shaped member 44a and the spherical portion 40a of the stud member at all times in bearing contact with bearing members 21a and 22a, the latter being positioned in a bore in the housing 15a.

It is apparent that within the scope of the invention, modifications and different arrangements may be made other than is herein disclosed, and the present disclosure is illustrative merely, the invention comprehending all variations thereof.

What I claim is:
1. A joint construction including a housing having a bore therein; a bearing having an interior substantially spherically curved bearing surface, said bearing being located in said bore of said housing; a stud member having a spherically shaped portion; a second member having a spherically shaped portion and adapted to form with the spherically shaped portion of said stud member a substantially ball shaped element, said members forming the ball shaped element both seating in said curved bearing surface; a closure for the bore of said housing, said closure having a concave inner surface forming a continuation of said curved bearing surface; and means arranged between said members for urging said spherically shaped portions into engagement with said curved bearing surface and said curved inner surface of said closure.

2. In combination, a tie rod; a housing for a ball and socket joint located at the end of said tie rod, said housing having a bore extending substantially transversely with respect to the longitudinal axis of said tie rod; a plurality of seat members having inner substantially spherically curved bearing surfaces and outer surfaces to fit the side walls of said bore in said housing, said seat members being separated longitudinally with respect to the axis of the bore in said housing and transversely with respect to the axis of said tie rod to form a solid bearing for longitudinal tie rod thrusts; a stud member having a stem and a spherically shaped end portion; a second member having a spherically shaped portion cooperating with the spherically shaped end portion of said stud member and forming a substantially ball shaped element; said members forming the ball shaped element both seating in said curved inner bearing surfaces of said seat members; and means arranged between said ball members for urging said spherically shaped portions of the ball members apart and into engagement with said curved bearing surfaces of said seat members and for forcing said seat members into engagement with the side walls of said bore in said housing.

3. In a tie rod ball and socket joint, a housing having a bore; a plurality of seat members having inner substantially spherically curved bearing surfaces and outer surfaces to fit the side walls of said bore of said housing, and said seat members separated longitudinally with respect to the axis of the bore of said housing; a stud member having a stem and a spherically shaped end portion; a second member having a spherically shaped portion cooperating with the spherically shaped end portion of said stud member and forming a substantially ball shaped element; said members forming the ball shaped element both seating in said curved inner bearing surfaces of said seat members; and means arranged between said ball members for urging said spherically shaped portions of the ball members apart and into engagement with said curved bearing surfaces of said seat members and for forcing said seat members into engagement with the side walls of said bore of said housing.

4. In a tie rod ball and socket joint, a housing having a cylindrical bore; a plurality of seat members having inner substantially spherically curved bearing surfaces and outer cylindrical surfaces to fit the side walls of said cylindrical bore of said housing, and said seat members separated longitudinally with respect to the axis of the bore of said housing; a stud member having a stem and a spherically shaped end portion; a second member having a spherically shaped portion and adapted to form with the spherically shaped end portion of said stud member a substantially ball shaped element; said members forming the ball shaped element both seating in said curved inner bearing surfaces of said seats; and a compression spring arranged between said ball members with the spring axis extending longitudinally with respect to said stem, said spring arranged to urge said spherically shaped portions of the ball members apart and into engagement with said curved bearing surfaces of said seat members and for forcing said seat members into engagement with the side walls of said cylindrical bore of said housing.

5. In a tie rod ball and socket joint, a housing having a bore open at one end and provided with a shoulder at the opposite end; a plurality of seat members having inner substantially spherically curved bearing surfaces and outer curved surfaces to fit the side walls of said bore of said housing and said seat members separated longitudinally with respect to the axis of the bore of said housing; a stud member having a stem and a spherically shaped end portion; a second member having a spherically shaped portion and adapted to form with the spherically shaped end portion of said stud member a substantially ball shaped element; said members forming the ball shaped element both seating in said curved inner bearing surfaces of said seats; means arranged between said ball members for urging said spherically shaped portions of the ball members apart and into engagement with said curved bearing surfaces of said seat members and for forcing said seat members into engagement with the side walls of said bore of said housing; and a closure for the open end of said housing.

6. In a joint construction, a housing having an interior bore; a plurality of interlocking elements, each of said elements having substantially hemispherical shaped portions of substantially similar radii, said elements cooperating to jointly form the ball portion of the joint, one of said elements having a projection and another of said elements having a seat for receiving said projection; bearing means having an exterior surface fitting within said bore in said housing and having an interior concave surface adapted to surround said ball portion of the joint; and means cooperating with said elements for urging the spherically shaped portions thereof into engagement with said bearing means.

WILLIAM A. FLUMERFELT.